United States Patent
Sugano

(10) Patent No.: US 7,948,106 B2
(45) Date of Patent: May 24, 2011

(54) POWER GENERATOR AND POWER GENERATION METHOD

(75) Inventor: Tomio Sugano, Tochigi (JP)

(73) Assignee: Institute For Energy Application Technologies Co., Ltd., Tochigi (JP)

( * ) Notice: Subject to any disclaimer, the term of this patent is extended or adjusted under 35 U.S.C. 154(b) by 2 days.

(21) Appl. No.: 12/064,392

(22) PCT Filed: Aug. 24, 2006

(86) PCT No.: PCT/JP2006/316557
§ 371 (c)(1),
(2), (4) Date: Apr. 2, 2008

(87) PCT Pub. No.: WO2007/023879
PCT Pub. Date: Mar. 1, 2007

(65) Prior Publication Data
US 2008/0191486 A1    Aug. 14, 2008

(30) Foreign Application Priority Data

Aug. 25, 2005   (JP) ................. 2005-243527

(51) Int. Cl.
F03B 3/04   (2006.01)

(52) U.S. Cl. ........................................ 290/54
(58) Field of Classification Search ............ 290/54, 290/44
See application file for complete search history.

(56) References Cited

U.S. PATENT DOCUMENTS

| | | | | |
|---|---|---|---|---|
| 2,426,765 A * | 9/1947 | Dorer | ............................ | 165/283 |
| 3,912,938 A * | 10/1975 | Filipenco | ........................ | 290/53 |
| 4,149,092 A | 4/1979 | Cros | | |
| 4,224,527 A * | 9/1980 | Thompson | ...................... | 290/54 |
| 4,274,009 A | 6/1981 | Parker, Sr. | | |
| 4,383,182 A * | 5/1983 | Bowley | ........................... | 290/43 |
| 4,398,095 A * | 8/1983 | Ono | ................................. | 290/53 |
| 4,408,127 A * | 10/1983 | Santos, Sr. | ..................... | 290/54 |
| 4,511,808 A * | 4/1985 | Jost | ................................. | 290/54 |
| 4,820,134 A | 4/1989 | Karlsson | | |
| 4,850,190 A | 7/1989 | Pitts | | |
| 5,281,856 A * | 1/1994 | Kenderi | ......................... | 290/54 |
| 5,440,176 A * | 8/1995 | Haining | ......................... | 290/54 |
| 5,808,368 A * | 9/1998 | Brown | ........................... | 290/53 |

(Continued)

FOREIGN PATENT DOCUMENTS

EP        0 181 754 A1     5/1986

(Continued)

OTHER PUBLICATIONS

Computer Translation of FR2395406 of Jun. 23, 1977 to Triai.*

Primary Examiner — Joseph Waks
(74) Attorney, Agent, or Firm — Arent Fox LLP

(57) ABSTRACT

A power generating apparatus and a power generating method capable of reducing a power generating price by generating a power by high head turbines and a generator used in a dam type or conduit type power plant even if the head of water is small. The power generating apparatus comprises first water wheels (2) driven by the flow of water (W1), pumps (3) connected to the first water wheels (2) and pumping up a part of the water (W1), a pressure control valve (7) raising the pressure of the water (W1) discharged from the pumps (3) to a predetermined pressure, a second water wheel (4) installed on the ground and driven by the water (W1) from the pressure control valve (7), and a generator (5) installed on the ground and driven by the second water wheel (4).

18 Claims, 12 Drawing Sheets

U.S. PATENT DOCUMENTS

| | | | |
|---|---|---|---|
| 5,834,853 A | 11/1998 | Ruiz et al. | |
| 7,307,356 B2 * | 12/2007 | Fraenkel | 290/54 |
| 7,466,035 B1 * | 12/2008 | Srybnik et al. | 290/43 |
| 7,554,215 B1 * | 6/2009 | Caragine | 290/42 |
| 7,604,454 B2 | 10/2009 | Power, III et al. | |
| 2004/0070210 A1 | 4/2004 | Johansen et al. | |
| 2005/0001432 A1 | 1/2005 | Drentham Susman et al. | |
| 2008/0265583 A1 * | 10/2008 | Thompson | 290/54 |
| 2009/0134623 A1 * | 5/2009 | Krouse | 290/43 |
| 2009/0179427 A1 * | 7/2009 | Cripps | 290/54 |

FOREIGN PATENT DOCUMENTS

| | | | |
|---|---|---|---|
| FR | 2395406 A * | 2/1979 | |
| GB | 1 561 436 A | 2/1980 | |
| GB | 2 026 620 A | 2/1980 | |
| GB | 2 311 566 A | 10/1997 | |
| GB | 2 340 892 A | 3/2000 | |
| GB | 2 347 976 A | 9/2000 | |
| GB | 2 348 250 A | 9/2000 | |
| GB | 2 348 465 A | 10/2000 | |
| GB | 2 396 889 A | 7/2004 | |
| JP | 61-8476 | 1/1986 | |
| JP | 2000-130310 A | 5/2000 | |
| JP | 2001-221143 A | 8/2001 | |
| JP | 2004-270674 A | 9/2004 | |
| JP | 2004-36522 A | 2/2005 | |
| JP | 2005-155334 A | 6/2005 | |
| JP | 2005155334 A | * | 6/2005 |

* cited by examiner

[FIG. 1]
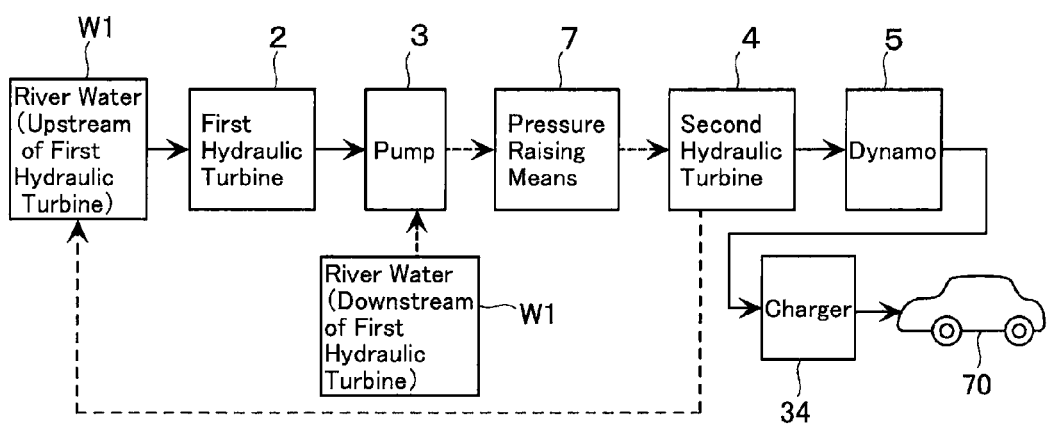

[FIG. 2]
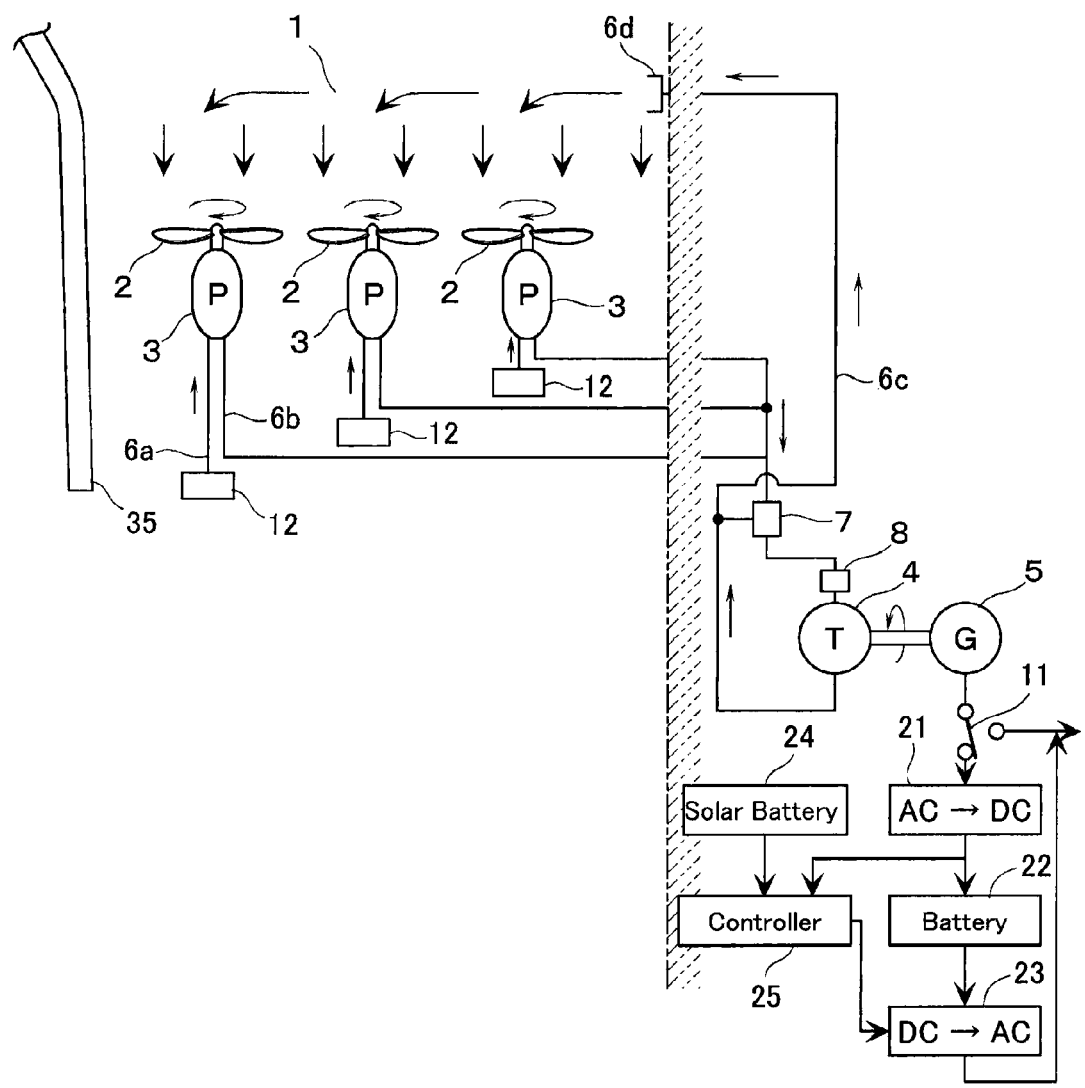

[FIG. 3]
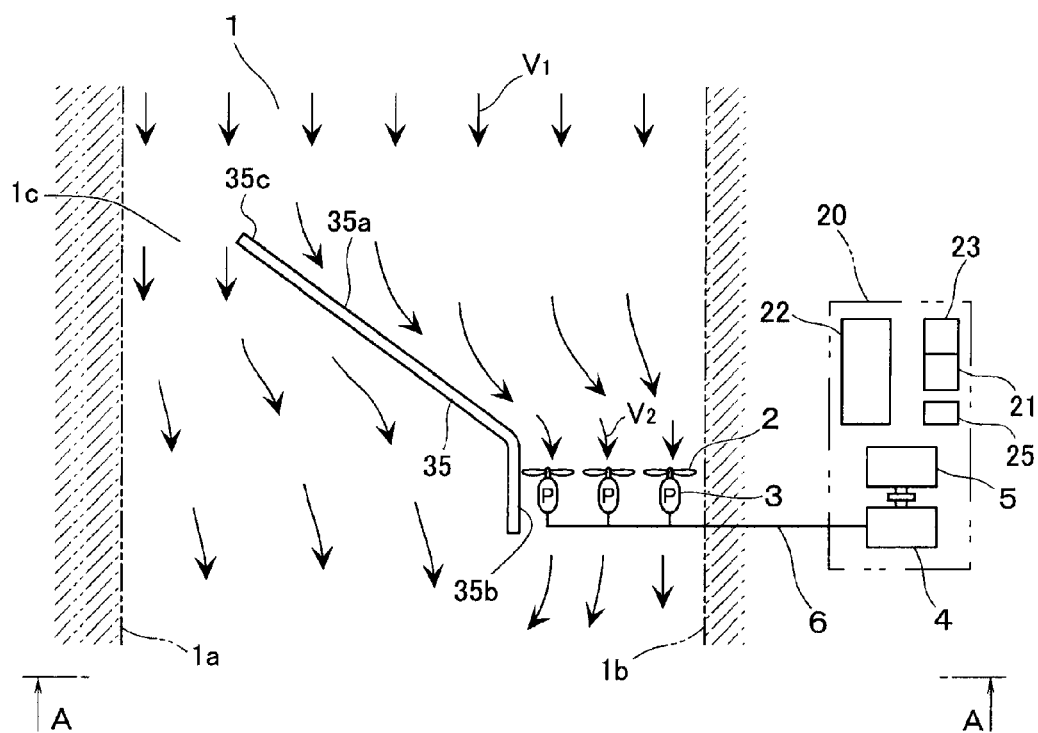

[FIG. 4]
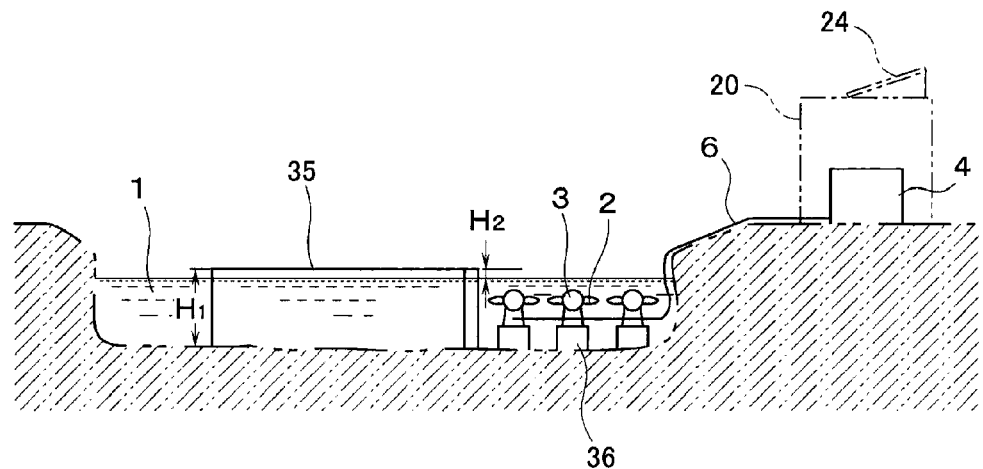
[FIG. 5]
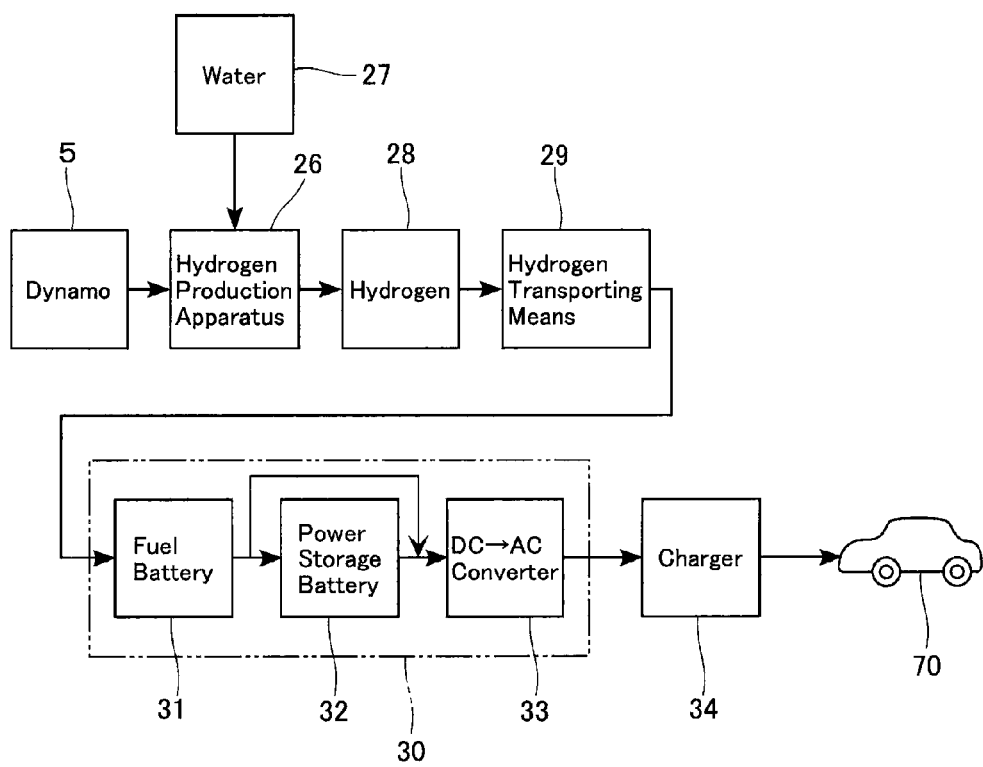

[FIG. 6]
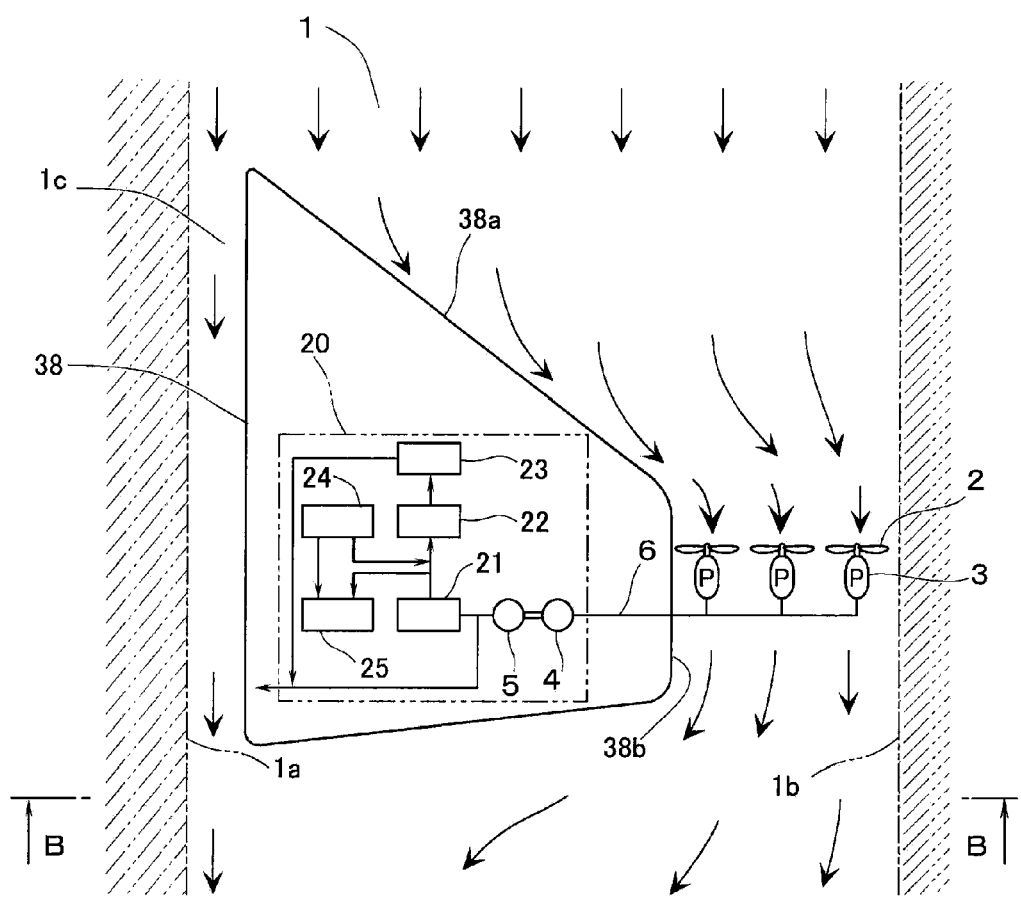

[FIG. 7]
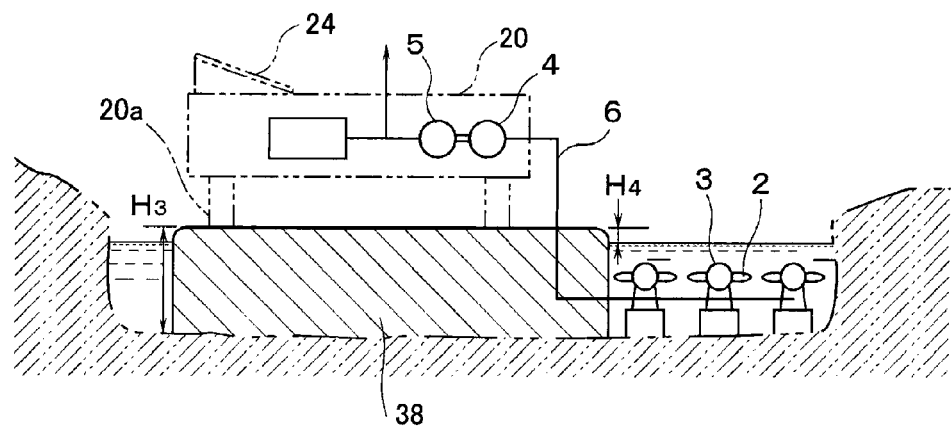
[FIG. 8]
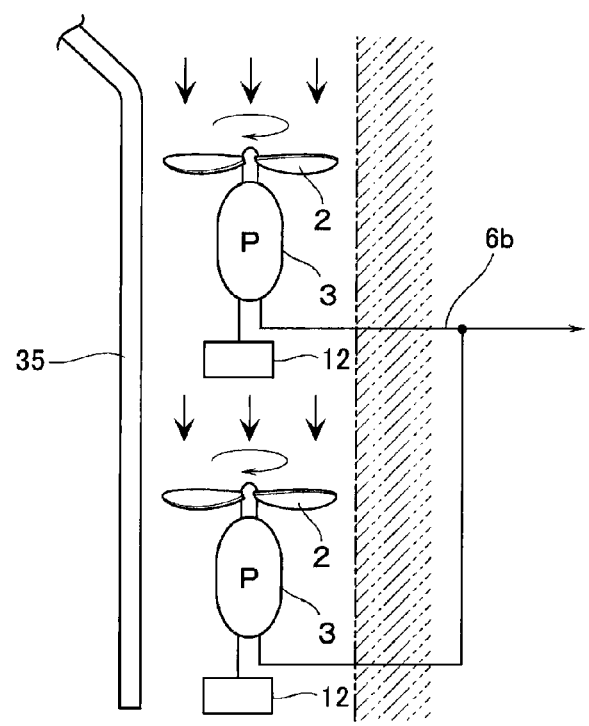

[FIG. 9]
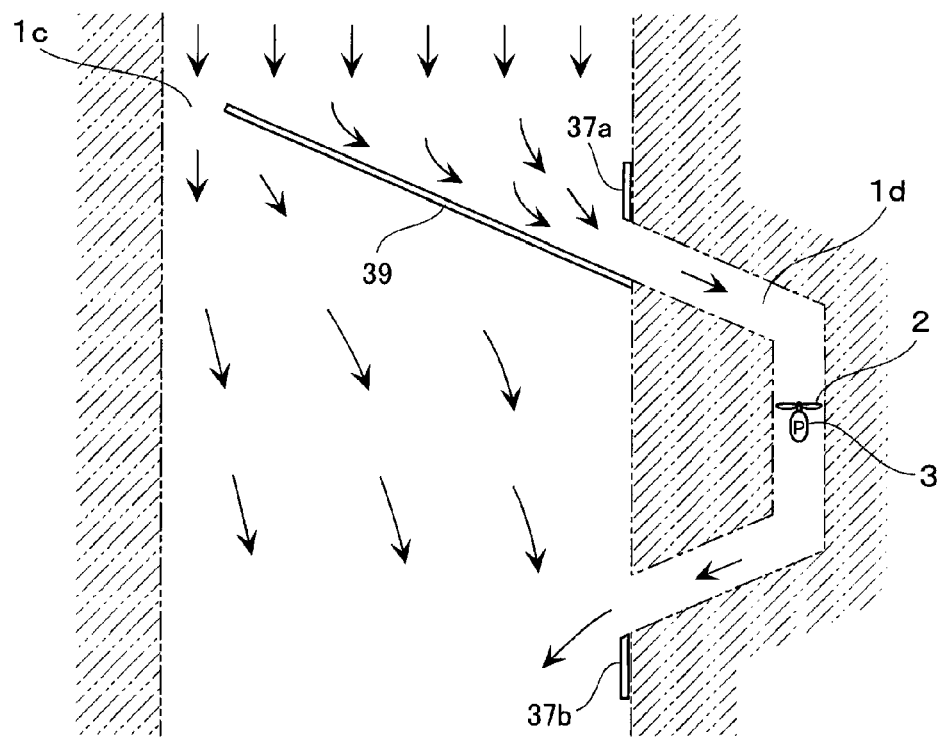
[FIG. 10]
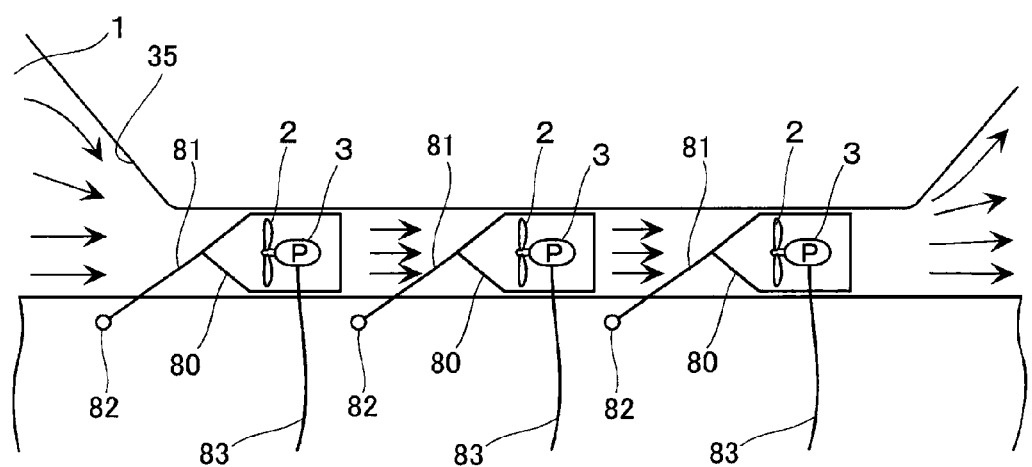

[FIG. 11]
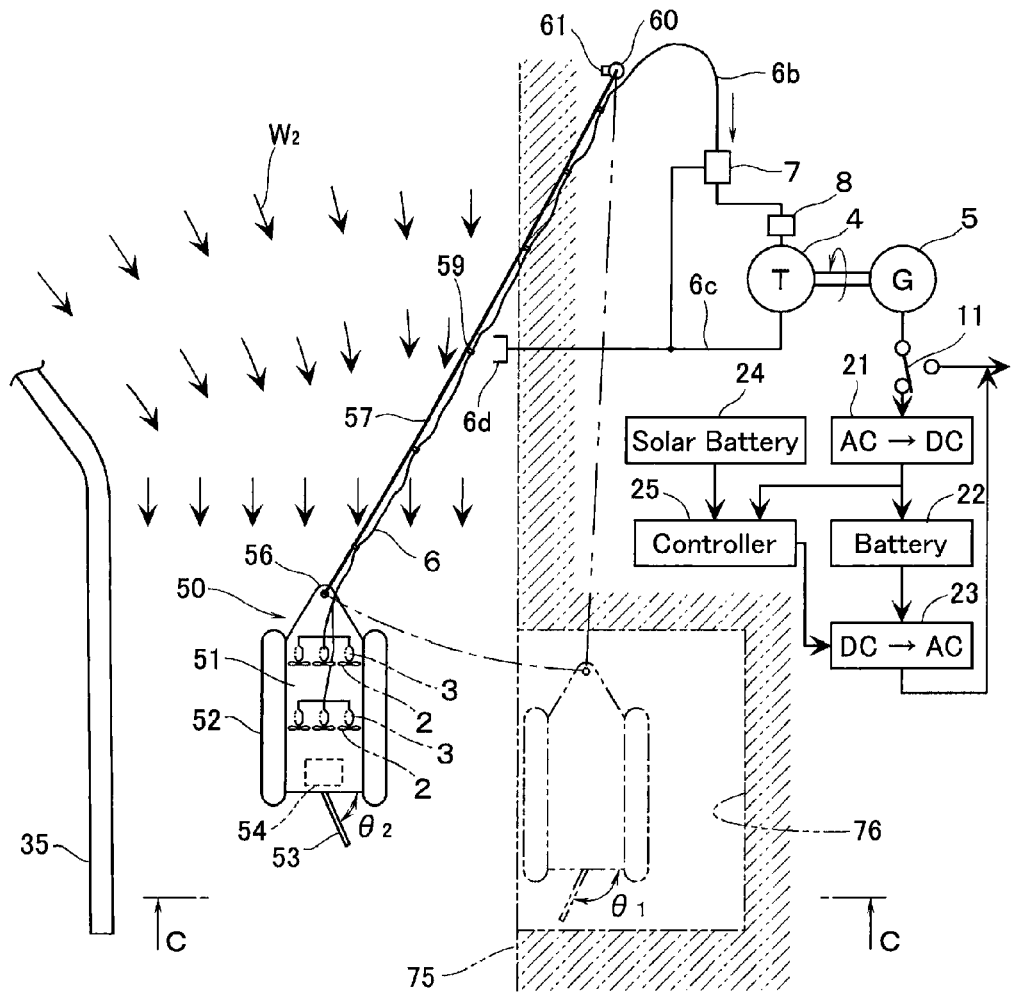
[FIG. 12]
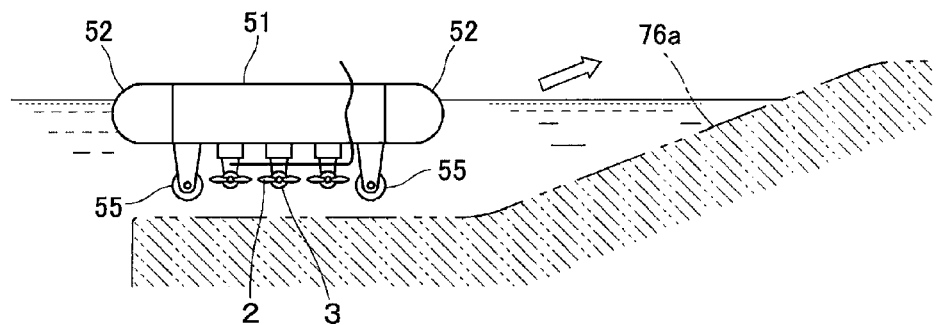

[FIG. 13]
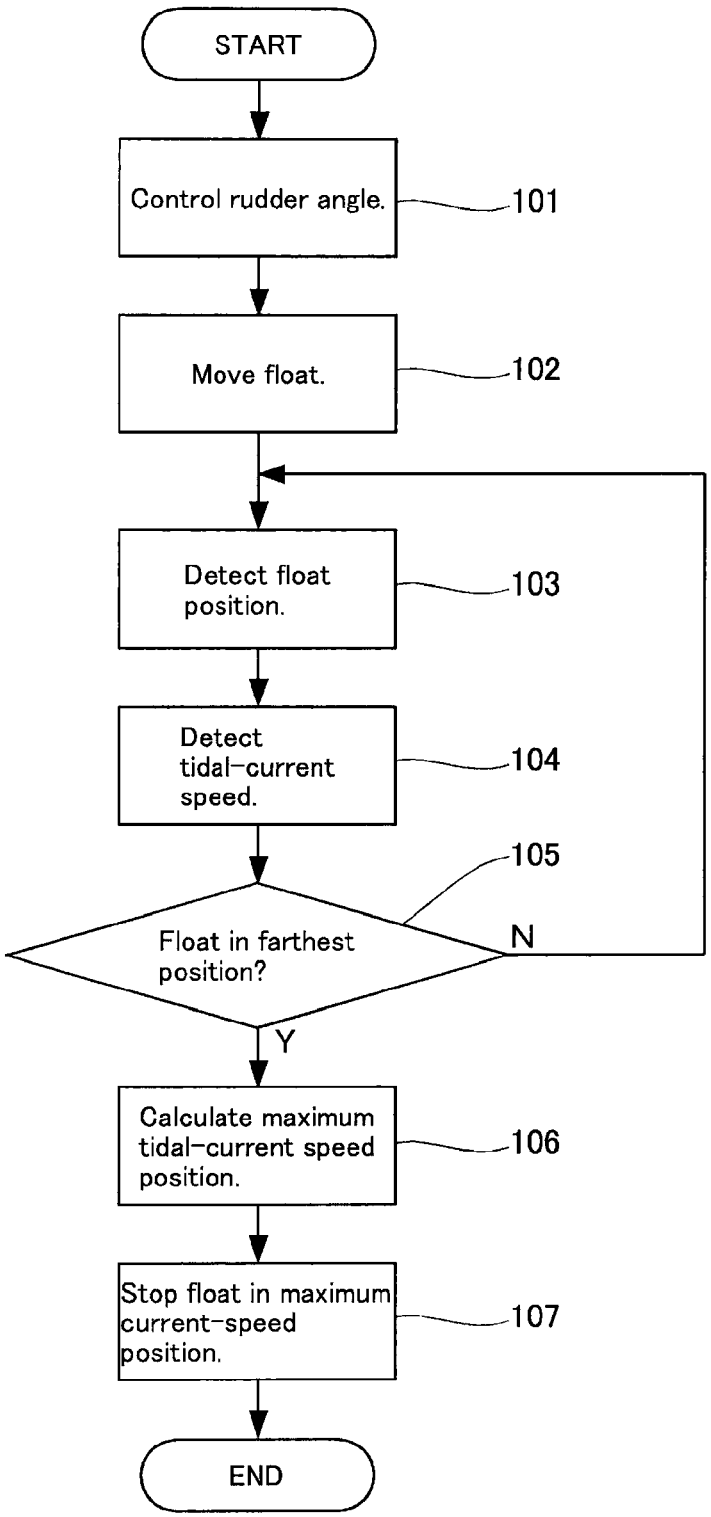

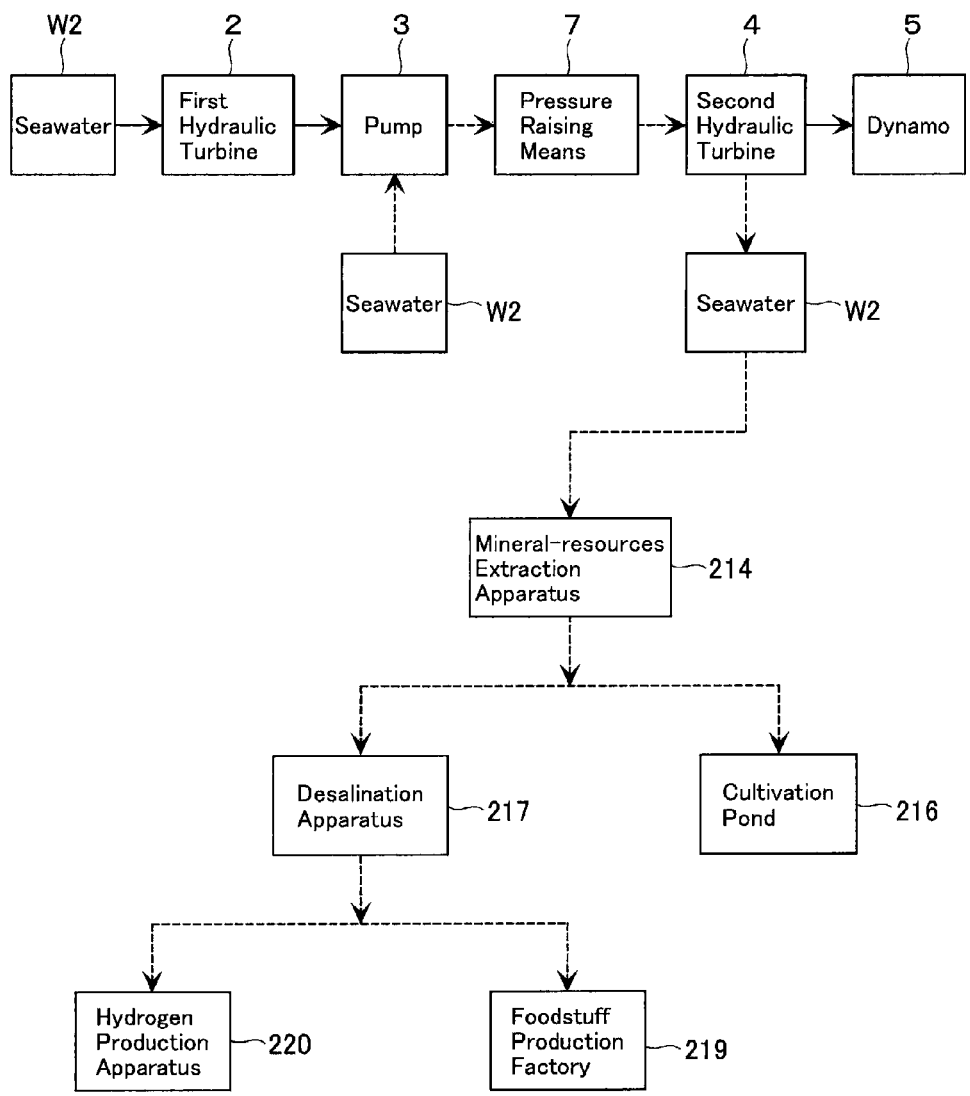

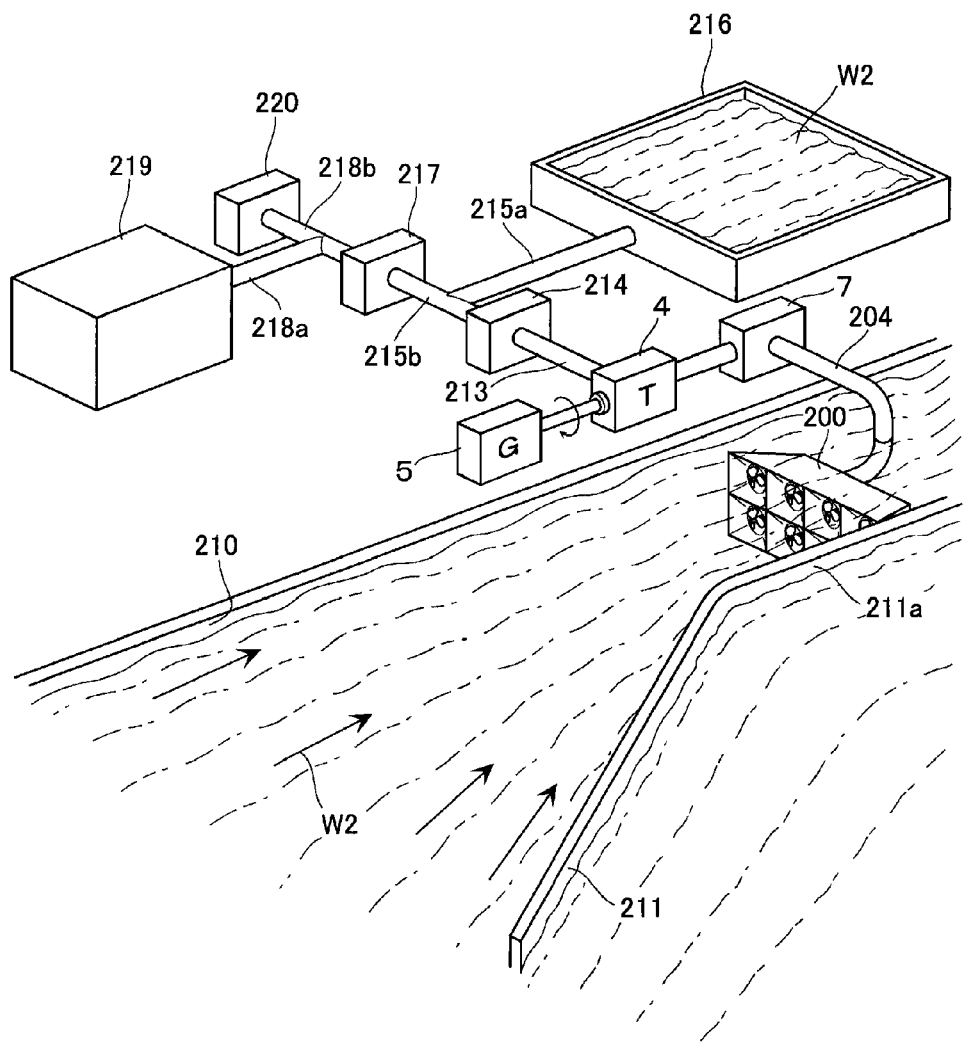
[FIG. 15]

[FIG. 16]
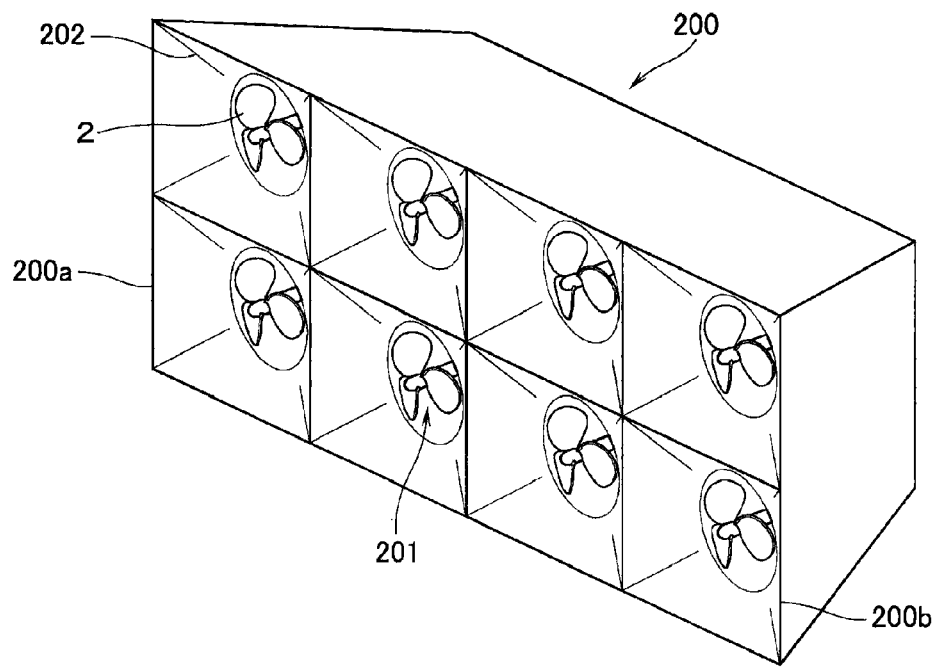
[FIG. 17]
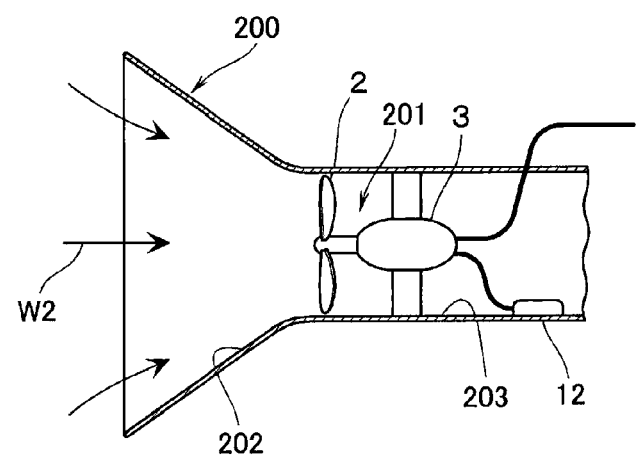

POWER GENERATOR AND POWER GENERATION METHOD

CROSS-REFERENCE TO RELATED APPLICATION

This application is a National Stage entry of International Application No. PCT/JP2006/316557, filed Aug. 24, 2006, the entire specification, claims, and drawings of which are incorporated herewith by reference.

FIELD OF THE INVENTION

The present invention relates to power generation by utilizing natural energy, and particularly, it relates to a power generator and a power generation method in which the energy of a water stream or a tidal current is used.

DESCRIPTION OF RELATED ART

An art of generating electricity using the torque of a hydraulic turbine (waterwheel) disposed inside of a fluid is known (e.g., refer to Patent Document 1). In addition, an art of producing an oil pressure using the torque of a wind turbine (windmill) and driving a dynamo by an oil-hydraulic motor is also known (e.g., refer to Patent Document 2).

Patent Document 1: Japanese Patent Laid-Open No. 8-210237 specification

Patent Document 2: Japanese Patent Laid-Open No. 11-280637 specification

SUMMARY OF THE INVENTION

Problems to be Solved by the Invention

In order to bring power generation using natural energy into wide use, the unit cost of such power generation needs to be significantly reduced. However, in such a generator as given in Patent Document 1 described above, a hydraulic turbine and a dynamo are both disposed into a fluid. This requires that the dynamo be highly waterproofed. Hence, such a power generation becomes expensive and its maintenance cost is also raised, thus leading to a rise in the power-generation unit cost.

Furthermore, in the case where electric power is generated using the water stream of a river, in order to lower the power-generation unit cost, desirably, a hydraulic turbine or a dynamo of a standard type which is used in a general hydroelectric power station should be employed. However, in such power generation using the water stream of a river, the difference in height by which water falls is extremely small. This makes it impossible to utilize a hydraulic turbine or the like for a great water-level difference which is employed in a dam-type or conduit-type power station.

Moreover, wind power generation is easily affected by weather and is lower in availability than hydroelectric power generation. Therefore, likewise in such a generator as described in Patent Document 2 described above, an oil pressure can not be produced unless a wind turbine rotates, thereby raising the power-generation unit cost. In addition, in this wind power generator, since a dynamo is driven using the pressure of oil, a pipe-friction pressure loss caused by the oil having a high viscosity becomes great, thus resulting in a fall in the power-generation efficiency. Besides, in such a power generator where the pressure of oil is used, the oil may leak out, which can bring about environmental pollution.

Therefore, it is an object of the present invention to provide a power generator and a power generation method which are capable of, even if the difference in height by which water falls is small, then generating electric power using a hydraulic turbine and a dynamo for a great water-level difference which is employed in a dam-type or conduit-type power station, lowering the unit cost of power generation and preventing environmental pollution.

Means for Solving the Problems

In order to attain the above described object, a power generator according to claim 1 is characterized by including: a first hydraulic turbine (waterwheel) which is driven by a flow of water; a pump which is connected to the first hydraulic turbine and draws up a part of the water; a pressure raising (boosting) means which raises the pressure of the water discharged from the pump to a predetermined pressure; a second hydraulic turbine which is disposed on the ground and is driven by the water from the pressure raising means; and a dynamo which is disposed on the ground and is driven by the second hydraulic turbine.

A power generator according to claim 2 is characterized in that in the power generator according to claim 1, a power storing means is provided which stores electric power generated by the dynamo.

A power generation method according to claim 3 is characterized by including the steps of: driving a first hydraulic turbine by a flow of water; drawing up a part of the water by a pump connected to the first hydraulic turbine; raising the pressure of the water discharged from the pump to a predetermined pressure; driving a second hydraulic turbine disposed on the ground by the water whose pressure is raised; and driving a dynamo disposed on the ground by the second hydraulic turbine to generate electric power.

A power generation method according to claim 4 is characterized in that in the power generation method according to claim 3, the electric power generated by the dynamo is used for producing hydrogen by electrolyzing water.

A power generation method according to claim 5 is characterized in that in the power generation method according to claim 3, the electric power generated by the dynamo is supplied to a vehicle which runs using an electric motor.

A power generator or a power generation method according to claim 6 is characterized in that in the power generator according to claim 1 or 2 or in the power generation method according to any one of claims 3 to 5, a plurality of the first hydraulic turbines and the pumps are provided.

A power generator or a power generation method according to claim 7 is characterized in that in the power generator according to claim 1 or 2 or in the power generation method according to any one of claims 3 to 5, the first hydraulic turbine is driven by a flow of water accelerated using a speed-increasing weir.

A power generator or a power generation method according to claim 8 is characterized in that in the power generator or the power generation method according to claim 7, the second hydraulic turbine and the dynamo are disposed on the speed-increasing weir.

A power generator or a power generation method according to claim 9 is characterized in that in the power generator according to claim 1 or 2 or in the power generation method according to any one of claims 3 to 5, the first hydraulic turbine and the pump are supported on a float which floats and moors on the water.

A power generator or a power generation method according to claim 10 is characterized in that in the power generator according to claim 1 or 2 or in the power generation method according to any one of claims 3 to 5: the pump draws up water from the downstream side of the first hydraulic turbine; and the water discharged from the second hydraulic turbine is returned to the upstream side of the first hydraulic turbine.

In addition, the present invention may also be as follows. First, in the power generation method according to claim 3: the water is seawater; and a mineral-resources extraction process is provided for capturing mineral resources included in the seawater discharged from the second hydraulic turbine.

Secondly, in the power generation method according to claim 3: the water is seawater; and the seawater discharged from the second hydraulic turbine is used for cultivating fish and shellfish.

Thirdly, in the power generation method according to claim 3: the water is seawater; and the seawater discharged from the second hydraulic turbine is desalinated. Then, the desalinated water is used for producing foodstuffs. Or, the desalinated water is used for producing hydrogen by utilizing electrolysis.

Advantages of the Invention

In the power generator and the power generation method according to claim 1 and claim 3, the second hydraulic turbine and the dynamo are disposed on the ground, the pressure of the water discharged from the pump is heightened up to a predetermined pressure, and the water whose pressure has been heightened is supplied to the second hydraulic turbine. Therefore, even if the difference in height by which water falls is small, a hydraulic turbine or a dynamo for a great water-level difference used in a dam-type or conduit-type power station can be employed. This makes it possible to keep the power generator low in cost and reduce the unit cost of power generation. Furthermore, the dynamo is disposed on the ground, so that a standard-type dynamo can be used. Compared with the case where the dynamo is disposed in the water, its maintenance becomes easier. Moreover, the dynamo is not designed to be driven by the pressure of oil, so that there is no danger of oil spillage into running water or a tidal current and no fear of environmental pollution. In addition, water or seawater has a lower viscosity than oil, and thus, it sustains a smaller pipe-friction pressure loss. Hence, the power-generation efficiency becomes higher than the case where the pressure of oil is used.

In the power generator according to claim 2, the electric power generated by the dynamo is stored in the power storing means. Therefore, the electric power stored in the night can be supplied for a peak load in the daytime. This helps level the power load down.

In the power generation method according to claim 4, the electric power generated by the dynamo is used for producing hydrogen by electrolyzing water. Therefore, a large quantity of hydrogen can be produced in a region having a heavy rainfall. If this hydrogen is sent to each area which has a big demand for electric power, power generation using clean energy is feasible in each area.

In the power generation method according to claim 5, the electric power generated by the dynamo is supplied to a vehicle which runs using an electric motor. Therefore, the emission of carbon dioxide from a vehicle such as a passenger vehicle, a bus and a truck is eliminated, so that global warming can be restrained.

In the power generation method according to claim 6, a plurality of the first hydraulic turbines and the pumps are provided. Therefore, a large quantity of water is supplied to the second hydraulic turbine, so that the dynamo can be rotated at high speed. This makes it possible to generate electric power on a large scale using flowing water or a tidal current.

In the power generation method according to claim 7, the first hydraulic turbine is driven by a flow of water accelerated using the speed-increasing weir. Therefore, even in a river which runs slowly, the flow rate of water discharged from the pump can be raised, thus increasing the generated energy.

In the power generation method according to claim 8, the second hydraulic turbine and the dynamo are disposed on the speed-increasing weir. Therefore, there is no need to secure a space for building a power station, so that power-station construction costs can be cut down.

In the power generation method according to claim 9, the first hydraulic turbine and the pump are supported on a moored float. Therefore, such costs become lower than the case where such a hydraulic turbine and a pump are supported to a foundation laid on the bottom of a river or the like.

In the power generation method according to claim 10, the water drawn up from a river by the pump is returned to the upstream side of the first hydraulic turbine. Therefore, the water which passes through the first hydraulic turbine flows faster, so that the generated energy can be increased.

In addition, the following advantages can be obtained. First, if the seawater discharged from the second hydraulic turbine is used, then there is no need to draw up seawater using a motor or the like, as is the case with conventional mineral-resources extraction or desalination by utilizing seawater. This makes it possible to extract mineral resources or desalinate seawater with less energy. Thereby, such costs can be reduced.

Secondly, the seawater discharged from the second hydraulic turbine is used for cultivating fish and shellfish. This facilitates the cultivation of fish and shellfish using the seawater even on the ground. Thereby, such cultivation is less affected by weather conditions or the like than cultivation in the sea, so that the productivity of fish and shellfish can be improved.

Thirdly, the seawater discharged from the second hydraulic turbine is desalinated. Thereby, foodstuff production or the like becomes possible in a place where desalinated water is difficult to acquire. Besides, the desalinated water is used for producing hydrogen through electrolysis, so that hydrogen can be produced even in a place where desalinated water necessary for electrolysis is difficult to acquire.

BRIEF DESCRIPTION OF THE DRAWINGS

FIG. 1 is a block diagram, showing the configuration of a power generator according to a first embodiment of the present invention.

FIG. 2 is a plan view of the power generator according to the first embodiment, showing its power generation system.

FIG. 3 is a plan view of a speed-increasing weir and its vicinity in the power generator according to the first embodiment.

FIG. 4 is a sectional view of the speed-increasing weir and its vicinity in the power generator, seen along an A-A line of FIG. 3.

FIG. 5 is a block diagram, showing how to utilize electric power generated by the power generator according to the first embodiment.

FIG. 6 is a plan view of a power generator according to a second embodiment of the present invention, showing its power generation system.

FIG. 7 is a sectional view of the power generator, seen along a B-B line of FIG. 6.

FIG. 8 is a plan view of a power generator according to a third embodiment of the present invention, showing its power generation system.

FIG. 9 is a plan view of a power generator according to a fourth embodiment of the present invention, showing its power generation system.

FIG. 10 is a plan view of a power generator according to a fifth embodiment of the present invention, showing its power generation system.

FIG. 11 is a plan view of a power generator according to a sixth embodiment of the present invention, showing its power generation system.

FIG. 12 is a sectional view of the power generator, seen along a C-C line of FIG. 11.

FIG. 13 is a flow chart, showing a position control method for a float in the power generator according to the sixth embodiment.

FIG. 14 is a block diagram, showing the configuration of a power generator according to a seventh embodiment of the present invention.

FIG. 15 is a schematic perspective view of the power generator of FIG. 14.

FIG. 16 is an enlarged perspective view of a frame in FIG. 15.

FIG. 17 is a sectional view of a flow passage formed in the frame of FIG. 16 and its vicinity.

DETAILED DESCRIPTION OF THE INVENTION

Hereinafter, embodiments of the present invention will be described with reference to the attached drawings.

First Embodiment

FIG. 1 to FIG. 5 show a first embodiment of the present invention. In the present invention, water includes seawater. Natural energy targeted in the present invention is a water stream in a river and a tidal current (ocean current) in a sea. The first embodiment can be applied for both a water stream and a tidal current, but herein, an example is given in which a water stream in a river is utilized.

Reference numeral 1 denotes a river. In the river 1, three first hydraulic turbines 2 are provided in water W1. As the first hydraulic turbine 2, various types can be used, as long as it can obtain a driving torque using a water stream. In the case of a shallow stream, desirably, a hydraulic turbine of a bucket-conveyer type should be employed. In this embodiment, a propeller turbine is used as the first hydraulic turbine 2. The first hydraulic turbine 2 formed by a propeller turbine is attached to the revolving shaft of a pump 3. In the pump 3, its revolving shaft is revolved by the first hydraulic turbine 2, so that the water W1 of the river 1 can be drawn up. As the pump 3, based on the pressure and flow rate of water supplied to a second hydraulic turbine 4, the most suitable type and size are selected. In this embodiment, three such first hydraulic turbines 2 and three such pumps 3 are provided. Each pump 3 is fixed to a foundation 36 laid on the bottom of the river 1. The foundation 36 is made of reinforced concrete. The first hydraulic turbines 2 are disposed underwater. However, in order to make their installation work easier, the first hydraulic turbines 2 and the pumps 3 may be configured so as to be supported on the ground's side. Besides, the first hydraulic turbines 2 and the pumps 3 may also be supported on a speed-increasing weir 35 (described later) formed by steel sheet pilings. To each pump 3, piping 6 is connected which extends to a power-generation house 20 built on the ground.

The piping 6 includes a suction pipe 6a and a discharge pipe 6b. In the suction pipe 6a for each pump 3, a filter 12 is attached to an end thereof. If a water stream of the river 1 rotates the first hydraulic turbine 2 and its rotation drives each pump 3, a part of the water W1 of the river 1 is drawn up via the filter 12 to the pump 3. The water W1 drawn up by the pump 3 is supplied through the discharge pipe 6b to the side of the second hydraulic turbine 4. In the discharge pipe 6b on the downstream side of the pump 3, a pressure control valve 7 is provided as the pressure raising means. This pressure control valve 7 has the function of raising the pressure of the water W1 discharged from each pump 3 to a predetermined pressure. The value of the water W1's pressure controlled by the pressure control valve 7 is set to an optimum value according to the second hydraulic turbine 4. In order to keep constant the pressure of the water W1 supplied to the second hydraulic turbine 4, the pressure control valve 7 has the function of returning a part of the water W1 supplied to the pressure control valve 7 to a downstream pipe 6c on the downstream side of the second hydraulic turbine 4. Incidentally, the pressure raising means is not limited to the pressure control valve 7, and thus, it may be a regulating valve which throttles a flow-passage cross section.

The power-generation house 20 is provided with the second hydraulic turbine 4, a dynamo 5 and the like. The second hydraulic turbine 4 and the dynamo 5 are fixed on a foundation laid on the ground. To the output shaft of the second hydraulic turbine 4, the dynamo 5's revolving shaft is connected. The dynamo 5 is revolved by the driving torque of the second hydraulic turbine 4, so that it generates AC electric power. The second hydraulic turbine 4 is provided with a speed governor 8. The speed governor 8 has the function of automatically adjusting the quantity of water supplied to the second hydraulic turbine 4 in line with a variation in the load of the dynamo 5. This helps prevent a variation in the dynamo 5's load from causing variations in the revolution numbers of the second hydraulic turbine 4 and the dynamo 5. Consequently, the AC power's frequency can be kept constant. The water W1 discharged from the second hydraulic turbine 4 passes through the downstream pipe 6c and returns from an outlet 6d to the upstream side of the first hydraulic turbines 2.

The second hydraulic turbine 4 is configured by a Francis hydraulic turbine or a Pelton hydraulic turbine of a standard type, or the like, which is employed in a dam-type or conduit-type power station or such another. The dynamo 5 is configured by a synchronous dynamo similar to the one employed in hydroelectric power station such as a dam-type or conduit-type power station. The reason that the plurality of first hydraulic turbines 2 and pumps 3 are provided is because the second hydraulic turbine 4 having a large size needs to be driven by a great volume of such water W1 supplied from the river 1. In other words, If the numbers of the first hydraulic turbines 2 and the pumps 3 is increased, the second hydraulic turbine 4 as large as the one of a dam-type or conduit-type power station can be rotated at high speed. Thereby, even in power generation using a water stream in the river 1, electric power can be generated on a massive scale. At the same time, compared with the structure where a dynamo is disposed underwater, the maintenance becomes easier. Besides, as the second hydraulic turbine 4 and the dynamo 5, standard-type ones used in an ordinary hydroelectric power station are employed, so that the cost of investing in the power generator can be cut down.

On the upstream side of the first hydraulic turbines 2, the speed-increasing weir 35 is disposed for heightening the velocity of the water W1. This speed-increasing weir 35 is fixed on the riverbed. As the speed-increasing weir 35, various types can be employed, including the one which is made of concrete, formed by laying stones or made of iron, as long as it can change the flow of the water W1. For example, the speed-increasing weir 35 can be easily obtained by driving steel sheet pilings into the riverbed. An end part 35c of the speed-increasing weir 35 on the upstream side is located near a riverbank 1a. An oblique part 35a of the speed-increasing weir 35 extends obliquely across from near the riverbank 1a up to the vicinity of the first hydraulic turbines 2. A straight part 35b of the speed-increasing weir 35 extends in the same direction as the river flow from near the first hydraulic turbines 2 on the upstream side up to the vicinity of the pumps 3 on the downstream side. On the upstream side from the speed-increasing weir 35, the water-flow velocity is set to $V_1$. In the place where the first hydraulic turbines 2 lie, the water W1 flows at a speed of $V_2$ far higher than $V_1$ along the speed-increasing weir 35.

The height from the riverbed to the top part of the speed-increasing weir 35 is $H_1$. The height from the water surface to the top part of the speed-increasing weir 35 is $H_2$. In this embodiment, the speed-increasing weir 35's top part is exposed from the water surface, but it can also be located slightly under the water surface. In this case, the speed-increasing weir 35 is hidden from ground view, and thus, the scenic view remains unspoiled. The height $H_1$ of the speed-increasing weir 35 is set to a height up to which the water W1 is hindered from flowing onto the ground when the volume of water increases in a flood or the like. When the water volume rises, the water W1 flows downstream over the speed-increasing weir 35. In a mountain area or another such place where water flows fast, there is no need for the speed-increasing weir 35, while in a plain area, water flows more gently than a mountain area. However, if the speed-increasing weir 35 for concentrating the water W1's flow is employed, the first hydraulic turbines 2 can be driven with greater energy.

On the upstream of the first hydraulic turbines 2, it is desirable that a fence be provided for preventing foreign matter such as fishes or driftwood from coming into the first hydraulic turbines 2. Desirably, this fence should be provided with a foreign-matter removal apparatus which prevents such foreign matter from staying there. Furthermore, in the suction part of the filter 12, desirably, a rotary brush for preventing its meshes from being blocked should be provided which is rotated with flowing-water energy. Moreover, likewise on the downstream of the pumps 3, desirably, a fence should be provided for preventing such foreign matter from coming into the side of the first hydraulic turbines 2.

The AC electric power generated by the dynamo 5 is supplied via a switch 11 to a person who demands it or a converter 21. The DC electric power obtained after a conversion by the converter 21 is supplied to a battery 22 as the power storing means. The destination to which the electric power is supplied is automatically changed by the switch 11 in accordance with variations in load. The battery 22 is formed by a valve-regulated lead acid battery for storing electric power. The battery 22 has a capacity, for example, for storing the full electric power produced in the nighttime. The electric power stored in the battery 22 is converted into an alternating current by a converter 23. In accordance with variations in load, a controller 25 has the function of supplying the electric power stored in the battery 22 via the converter 23 to a person who demands it. A solar battery 24 supplies electric power to the controller 25. For example, in an overseas undeveloped region, electric power cannot often be obtained when this generator is constructed. Hence, in this generator, at first, using electric power from the solar battery 24, the controller 25 is operated to start power generation. In the operation after this, electric power is supplied via the converter 21 to the controller 25. As the power storing means, except for a battery, there is pumped storage power plant or the like. Using pumped storage power plant, a large amount of power from natural energy can be stored.

As shown in FIG. 5, a part of the electric power from the dynamo 5 is designed to be sent, for example, to a hydrogen production apparatus 26. Water 27 is supplied to the hydrogen production apparatus 26. If the hydrogen production apparatus 26 is installed near a riverbank, the water W1 of the river 1 can be easily supplied to the hydrogen production apparatus 26. In the hydrogen production apparatus 26, water is electrolyzed using the electric power from the dynamo 5, so that hydrogen 28 can be produced. If the power generator according to the present invention is applied, for example, for a river in a region such as the Himalayas which has a heavy rainfall, a large amount of power can be obtained. If this large amount of power is supplied through a transmission line to the hydrogen production apparatus 26 constructed near a port, a great quantity of hydrogen can be produced near the port. The hydrogen 28 produced by the hydrogen production apparatus 26 is liquefied and transported to an overseas place where there is a demand for it by a hydrogen transporting means 29 such as a ship. The reason that the electric power generated from the dynamo 5 is transported by ship after transformed into liquid hydrogen is because power transmission to overseas regions by means of transmission lines causes a great power loss to raise the unit cost of power generation.

The hydrogen 28 which has arrived at a port of a place where there is a demand for it is supplied, for example, to a power station 30 built near the port. The power station 30 is provided with a fuel battery 31, a battery 32 for power storage and a converter 33. The large-sized fuel battery 31 generates DC electric power using the supplied hydrogen 28. A part of the electric power from the fuel battery 31 is stored in the power-storage battery 32. The DC electric power from the fuel battery 31 is converted into an alternating current by the converter 33 and is sent to a person who demands it. Incidentally, if the hydrogen 28 is used as transportation energy for the hydrogen transporting means 29, then in a process from power generation in the river 1 to power generation in the power station 30, no carbon dioxide is emitted at all. This makes it possible to restrain global warming due to carbon dioxide emission. In order to further restrain global warming due to carbon dioxide emission, it is desirable that electric power generated by the power generator according to the present invention be supplied to a vehicle which runs by use of an electric motor. For example, as shown in FIG. 1 and FIG. 5, if this electric power from natural energy is used for charging the battery of an electric car 70 by means of a charger 34, the automobile carbon-dioxide emission can be restrained as a whole. Herein, the vehicle which runs by use of an electric motor includes both of a vehicle which has a battery as its power source and a vehicle which is supplied electric power via a pantograph from stringing (wiring). Hence, the vehicle which runs by use of an electric motor includes a passenger vehicle, as well as a truck, a bus, a self-running streetcar (tram), a railway vehicle and the like.

Next, the operation according to this embodiment will be described. The water W1 running in the river 1 is guided toward the side of the first hydraulic turbines 2 along the speed-increasing weir 35. In the place where the first hydraulic turbines 2 are disposed, the water W1 flows faster because of the speed-increasing weir 35. Thereby, the first hydraulic turbines 2 are rotated by the water W1 running faster. If the pumps 3 are revolved by the first hydraulic turbines 2, a part of the water W1 of the river 1 is drawn up by the pumps 3.

Then, the water W1 is supplied from the pumps 3 to the side of the second hydraulic turbine 4. The pressure of the water W1 discharged from the pumps 3 is raised to a predetermined pressure by the pressure control valve 7 as the pressure raising means. The water W1 whose pressure has been raised is supplied to the second hydraulic turbine 4, and the second hydraulic turbine 4 is driven to generate electrical energy using the dynamo 5. The outlet 6d is located upstream from the second hydraulic turbine 4, and thus, the water W1 discharged from the second hydraulic turbine 4 is returned to the upstream side of the first hydraulic turbines 2. Thereby, the water quantity on the upstream side of the first hydraulic turbines 2 increases, so that the velocity of the water W1 which passes through the first hydraulic turbines 2 becomes higher.

In this embodiment, the speed-increasing weir 35 is provided in the river 1, but power generation is feasible without the speed-increasing weir 35. In a gently-running place of the river 1, the flowing water has a small amount of energy. Hence, it is difficult to generate electricity using a hydraulic turbine or a dynamo which is employed in a dam-type or conduit-type power station. According to the present invention, even if it runs slowly, the water pressure supplied to the second hydraulic turbine 4 is heightened by the pressure control valve 7. Thereby, a standard-type hydraulic turbine employed in a dam-type or conduit-type power station can be driven. Therefore, the dynamo 5 can be driven, for example, by the second hydraulic turbine 4 formed by a Pelton hydraulic turbine which is used when water falls by a large difference in height. Even if the river 1's water stream is used, electric power can be generated in the same way as power generation using a large level difference. In this manner, in terms of the water W1 drawn up by the pumps 3, its pressure is raised by the pressure raising means. Hence, even if the position of the filter 12 which corresponds to the position where water is taken in is lower than the second hydraulic turbine 4's position, the second hydraulic turbine 4 can be rotated.

Furthermore, in this embodiment, the plurality of first hydraulic turbines 2 and pumps 3 are provided. Therefore, the flow rate of the water W1 supplied to the second hydraulic turbine 4 can be sufficiently secured. This contributes to heightening the output of the second hydraulic turbine 4. Accordingly, even in the case where the river 1's stream is shallow, if a large number of such first hydraulic turbines 2 and pumps 3 are simultaneously used, then great-output power generation can be realized without using a hydraulic turbine which has a diameter as large as that of a wind turbine (windmill) for wind power generation.

In general, a hydraulic turbine with a large diameter is difficult to mass-produce, and thus, its manufacturing cost becomes higher. As given in this embodiment, if the plurality of first hydraulic turbines 2 are used, energy equivalent to that of a large-diameter hydraulic turbine can be obtained. A small-diameter hydraulic turbine is suitable for mass production and is produced at a low cost. Besides, a small-diameter hydraulic turbine is easy to transport to a construction site, handle and install. In this way, according to the structure of this power generator in which many such first hydraulic turbines 2 each of which has a small diameter are provided, a mass-production advantage or the like is obtained so that its investment cost can be cut down.

Moreover, the water W1 of the river 1 runs incessantly throughout the year. Therefore, electric power can be generated at all times in the power generator according to the present invention. Consequently, its availability becomes far higher than that of wind power generation or solar-photovoltaic power generation. This helps make its power-generation unit cost lower than any other power generation with natural energy.

In a conventional generator which includes a dynamo provided in a float on the water, a high-voltage cable floats in the wake of the float. Hence, the high-voltage cable can be easily damaged, thus raising a disadvantage in reliability. In contrast, in this embodiment, the dynamo 5 is fixed inside of the power-generation house 20 built on the ground, and thus, the high-voltage cable can be fixed. Therefore, the high-voltage cable for supplying electric power to a person who demands it is not supposed to wave, the power generator becomes more reliable. In addition, the dynamo 5 is provided on the ground, and thus, its maintenance becomes easier than a dynamo configured so as to be disposed in the water. Besides, Moreover, the pump 3 driven by the first hydraulic turbine 2 is configured not by an oil-hydraulic pump, but by a water pump. Thus, even if the water W1 leaks into the river 1 from the pump 3 or the discharge pipe 6b, the river 1 is not supposed to be polluted.

Second Embodiment

FIG. 6 and FIG. 7 show a second embodiment of the present invention. In this embodiment, a speed-increasing weir 38 has a configuration different from that according to the first embodiment, but the other configurations are the same as those according to the first embodiment. Hence, the component elements are given the same reference characters and numerals as those according to the first embodiment, as long as the former are identical to the latter. Thus, their description is omitted. The following third to seventh embodiments are described in the same manner.

As shown in FIG. 6, in the river 1, the speed-increasing weir 38 is provided which is trapezoidal like a shoal (holm). The river 1 narrows gradually from upstream to downstream along an oblique-side part 38a of the speed-increasing weir 38. Downstream from the oblique-side part 38a, a straight part 38b continues. This straight part 38b extends in the same direction as the river-running direction from near the upstream of the first hydraulic turbines 2 up to near the downstream of the pumps 3. The first hydraulic turbines 2 and the pumps 3 are disposed between the straight part 38b and a riverbank 1b. Between the straight part 38b and the riverbank 1b, the flowing water gathers and runs much faster than on the upstream side. The height of the speed-increasing weir 38 from the riverbed is $H_3$. The height of the speed-increasing weir 38 from the water surface is $H_4$. The height $H_3$ is set to a height up to which water is prevented from flowing onto the ground when the volume of water increases in a flood or the like. When the water volume rises, water flows downstream over the speed-increasing weir 38. The power-generation house 20 is disposed on the speed-increasing weir 38. This power-generation house 20 is supported by a plurality of struts 20a. The height of each strut 20a is designed so that the power-generation house 20 is not submerged at the time when the volume of water increases.

As is the case with this embodiment, the speed-increasing weir 38 is shaped like a shoal, so that there is no need to secure a space for building a power station in a place other than the river 1. This makes it possible to reduce power-station construction costs.

Third Embodiment

FIG. 8 shows a third embodiment of the present invention. In the above described first and second embodiments, the plurality of first hydraulic turbines 2 are disposed perpendicularly to the river-running direction. However, in this embodiment, a plurality of such first hydraulic turbines 2 are disposed in parallel with the river-running direction. This disposition is effective in the case where the river 1 is narrow.

Fourth Embodiment

FIG. 9 shows a fourth embodiment of the present invention. In the fourth embodiment, a water passage 1d for leading river water is provided on the ground side. In the water passage 1d, the first hydraulic turbine 2 and the pump 3 are disposed. A speed-increasing weir 39 is provided in the river 1. The speed-increasing weir 39 guides a large quantity of water in the river 1 to the water passage 1d, and thus, the water flows faster through the water passage 1d. In this manner, if the first hydraulic turbine 2 and the pump 3 are disposed in the water passage 1d, their maintenance becomes easier than the case where a hydraulic turbine and a pump are directly disposed in the river 1. For example, if gates 37a and 37b which can be opened and closed are provided at the upstream end and downstream end of the water passage 1d, respectively, then water can be hindered from flowing into the water passage 1d. Consequently, the first hydraulic turbine 2 and the pump 3 can be easily inspected.

Fifth Embodiment

FIG. 10 shows a fifth embodiment of the present invention. The first hydraulic turbine 2 and the pump 3 are supported on a float 80 afloat on the river 1. The float 80 is moored by means of a rope 81 to a fixing means 82 provided on the ground side. A high-pressure hose 83 as piping is connected to the pump 3. The water discharged from the pump 3 is supplied through the high-pressure hose 83 to the second hydraulic turbine 4. Thereby, even if the float 80's position shifts as the river 1's water level varies, the high-pressure hose 83 follows the float 80, so that the piping can be prevented from being damaged.

In the above described first embodiment, the pump 3 is configured so as to be fixed to the foundation 36 laid on the riverbed. However, in this embodiment, the float 80 is designed to be moored, and thus, it is unnecessary to provide the foundation 36 which causes the construction to be costly. This is helpful in cutting down the investment cost.

Sixth Embodiment

FIG. 11 to FIG. 13 show a sixth embodiment of the present invention in which tidal-current energy in a sea is utilized. In this embodiment alike, in order to increase the velocity of a tidal current, desirably, the speed-increasing weir 35 should be provided. Reference numeral 50 designates a float which is afloat on seawater W2. The float 50 includes a trunk 51, a tank 52, a rudder 53 and a steering portion 54. To the trunk 51, the tank 52 are attached on each right and left side thereof. The rudder 53 is disposed on the downstream side of the trunk 51. The rudder 53 is driven by the steering portion 54. The float 50 is connected, for example, by means of a wired rope 57, to a post 60 on the ground. The float 50 can pivot upon the post 60 on the sea side or on the ground side. The piping 6 for sending the seawater W2 extends along the wired rope 57. The piping 6 is supported by means of a plurality of connection fittings 59 to the wired rope 57.

The first hydraulic turbine 2 and the pump 3 are attached to the trunk 51 so that they can freely move. Thereby, the first hydraulic turbine 2 and the pump 3 are designed to face constantly to the tidal-current direction. The pump 3 is driven by the first hydraulic turbine 2 to draw up a part of the seawater W2. The pressure of the seawater discharged from the pump 3 is raised by the pressure control valve 7. The second hydraulic turbine 4 and the dynamo 5 are provided on the ground side. The second hydraulic turbine 4 is driven by the seawater W2 whose pressure has been heightened, and the dynamo 5 is driven by the second hydraulic turbine 4. The seawater W2 discharged from the second hydraulic turbine 4 is returned to the upstream side of the first hydraulic turbine 2. Each hydraulic turbine 2, 4, the pump 3 and the like in which the seawater W2 is used are made of a metal material having corrosion resistance to the seawater W2.

To the bottom surface of the trunk 51, wheels 55 are attached. The wheels 55 are used for leading the float 50 to the ground side. In the post 60, an angle sensor 61 is provided which detects the position of the float 50. The angle sensor 61 detects the float 50's position based on the angle of the post 60 to the wired rope 57. In the end part of the float 50 on the upstream side, a current-velocity sensor 56 is provided which detects the tidal-current velocity. Each signal from the angle sensor 61 and the current-velocity sensor 56 is inputted in a controller 25. The steering portion 54 is controlled by the controller 25. On the side of a coast 75, a port 76 for storing the float 50 is formed. Using a slope 76a of the port 76, the float 50 can be pulled up onto the ground.

In this embodiment, as shown in FIG. 11, when the float 50 lies in the port 76, the rudder 53 is set to an angle $\theta_1$. When the float 50 is moved to the side of the coast 75, the rudder 53 is controlled so as to have an angle $\theta_2$ by the steering portion 54. FIG. 13 shows the control of the float 50's position. In a step 101, the rudder 53's angle is controlled. In a step 102, the rudder 53's angle is controlled so as to be $\theta_2$, and thereby, the float 50 moves away from the coast 75 by a tidal-current force which acts on the rudder 53. In a step 103, the float 50's position is detected based on a signal from the angle sensor 61. In a step 104, the tidal-current velocity is detected based on a signal from the current-velocity sensor 56. In a step 105, a decision is made whether or not the float 50 has reached the position farthest away from the coast 75. If it has reached the farthest position, the processing goes ahead to a step 106. Then, on the basis of signals from the angle sensor 61 and the current-velocity sensor 56, the place where the tidal-current velocity becomes the maximum is calculated by the controller 25. In a step 107, based on the calculation result at the step 106, the rudder 53 is controlled so that the float 50 moves to the maximum current-velocity position and comes to a stop there. In this way, the float 50 halts in the maximum current-velocity position, so that a great power-generation output can be obtained.

Seventh Embodiment

FIG. 14 to FIG. 17 show a seventh embodiment of the present invention, and particularly, show how to use the seawater W2 discharged from the second hydraulic turbine 4. As shown in FIG. 15, a seawall 210 made of reinforced concrete extends along a coast. In the sea which faces the seawall 210, the seawater W2 flows along the seawall 210. Near the seawall 210, a speed-increasing weir 211 is provided which extends obliquely in a direction where it separates from the seawall 210 toward the upstream side. In the speed-increasing weir 211, a downstream end part 211a thereof is almost parallel to the seawater W2's running direction. The speed-increasing weir 211's bottom part is fixed on the seabed and its upper part protrudes from the sea surface. Under the sea between the seawall 210 and the downstream end part 211a of the speed-increasing weir 211, a metal frame 200 is disposed.

In the frame 200, one end part 200a is supported to the seawall 210 and the other end part 200b is supported to the downstream end part 211a of the speed-increasing weir 211. The frame 200 is shaped like substantially a rectangular parallelepiped and has a plurality of flow passages 201. Each flow passage 201 is to pass the seawater W2 through and extends the seawater W2's running direction. The speed-increasing weir 211 is made of reinforced concrete in the same way as the seawall 210, but it may also be formed by a member made of metal or the like which has corrosion resistance. The speed-increasing weir 211 has the function of allowing the seawater W2's current to converge upon each flow passage 201 of the frame 200 and raising the velocity of the seawater W2 which passes through each flow passage 201. It is desirable that the speed-increasing weir 211 not only heighten the velocity of the seawater W2, but also have the seawall function of keeping a high wave down.

As shown in FIG. 17, the upstream part of each flow passage 201 in the frame 200 is shaped like a funnel part 202 whose flow-passage cross section becomes gradually smaller toward the downstream. A cylinder part 203 is connected to the downstream end of the funnel part 202. The first hydraulic turbine 2 and the pump 3 are disposed inside of the cylinder part 203. The first hydraulic turbine 2 is located on the upstream side of the pump 3, and the first hydraulic turbine 2 is connected to the revolving shaft of the pump 3. The pump 3 is supported to the interior circumferential surface of the cylinder part 203. The first hydraulic turbine 2 is rotated with the kinetic energy of the seawater W2 accelerated through the funnel part 202. The filter 12 which takes in the seawater W2 lies on the downstream side of the pump 3. The filter 12's suction part is provided with a rotary brush (not shown) which is rotated by the seawater W2's flow and prevents seaweed or the like from clinging. Upon being revolved by the first hydraulic turbine 2, the pump 3 draws up the seawater W2 via the filter 12. The seawater W2 discharged from each pump 3 gathers on the side of the frame 200 and is supplied through piping 204 to a pressure raising means 7 provided on the ground. The second hydraulic turbine 4 disposed on the ground is rotated by the seawater W2 whose pressure has been raised by the pressure raising means 7. The dynamo 5 disposed on the ground is revolved by the second hydraulic turbine 4 to generate AC electric power. The electric power generated by the dynamo 5 is supplied through a transmission line to a place where there is a demand for it.

The seawater W2 discharged from the second hydraulic turbine 4 is designed to be supplied through piping 213 to a mineral-resources extraction process disposed on the ground. In the mineral-resources extraction process, a mineral-resources extraction apparatus 214 is provided. The mineral-resources extraction apparatus 214 has the function of capturing uranium in seawater using an adsorption method. In the adsorption method, uranium is adsorbed into an adsorbent such as titanium acid, and thereafter, a desorbent liquid is obtained from the adsorbent in a desorbent. After this, an ion-exchange resin passes through the desorbent so that it is adsorbed into the ion-exchange resin. Then, the extracted liquid adsorbed into the ion-exchange resin is subjected to the same processing as a uranium-ore processing. Thereby, uranium can be extracted. The seawater W2 discharged from the second hydraulic turbine 4 is supposed to pass through the whole mineral-resources extraction apparatus 214. Hence, a great volume of such seawater W2 comes into contact with the adsorbent, so that a large quantity of mineral resources can be extracted. The uranium extracted by the mineral-resources extraction apparatus 214 is used for nuclear power generation. Incidentally, mineral resources which can be extracted are not limited to uranium, and lithium or the like included in seawater can also be extracted. In this manner, the seawater W2 discharged from the second hydraulic turbine 4 can be utilized, so that there is no need to draw up the seawater W2 using a motor or the like. This makes it possible to extract mineral resources with less energy.

The seawater W2 after the uranium extraction discharged from the mineral-resources extraction apparatus 214 is designed to be supplied through piping 215a to a cultivation pond 216 disposed on the ground. The cultivation pond 216 is a place for cultivating fish and shellfish which grows in seawater. The temperature of the seawater W2 supplied to the cultivation pond 216 is regulated so as to be a temperature suitable for cultivating fish and shellfish. The electric power from the dynamo 5 is used for the electric power necessary for regulating this seawater W2's temperature. In the cultivation pond 216 disposed on the ground, such cultivation is less affected by weather conditions or the like than cultivation in the sea, so that the productivity of fish and shellfish can be improved. In this embodiment, the seawater W2 discharged from the mineral-resources extraction apparatus 214 is used, but it is a matter of course that the seawater W2 discharged directly from the second hydraulic turbine 4 can be utilized. Incidentally, in the seawater W2 after the uranium extraction, a residual is returned into the sea.

The seawater W2 after the uranium extraction discharged from the mineral-resources extraction apparatus 214 is designed to be supplied through piping 215b to a desalination apparatus 217 disposed on the ground. The desalination apparatus 217 has the function of desalinating the seawater W2 in a reverse osmosis method. The reverse osmosis method is the method of obtaining fresh water by applying pressure to the seawater W2 and allowing the seawater W2 to pass through a kind of filter called reverse osmosis membranes. This method requires a less energy consumption, as well as easier operation maintenance and management than any other desalination method. The fresh water obtained by the desalination apparatus 217 is used, as described later, for producing foodstuffs or producing hydrogen.

The fresh water produced by the desalination apparatus 217 is designed to be supplied through piping 218a to a foodstuff production factory 219. The foodstuff production factory 219 is, for example, a factory where vegetables and the like are automatically produced in hydroponics. The electric power generated by the dynamo 5 is used for the optical and thermal energy necessary for growing vegetables and the like. Fresh water is indispensable for the hydroponics of vegetables and the like. Even in a place where fresh water is difficult to acquire, if there is the seawater W2, foodstuffs can be produced using the desalination apparatus 217. Besides, feed grain for domestic animals can also be produced using such fresh water, so that livestock can be raised. In the foodstuff production factory 219, the conditions for growing vegetables and the like can be easily kept constant by controlling light or heat. Therefore, such growth is less affected by weather conditions or the like than outdoor growth in a paddy or a field, so that the productivity can be enhanced.

The fresh water produced by the desalination apparatus 217 is designed to be supplied through piping 218b to a hydrogen production apparatus 220. The hydrogen production apparatus 220 has the function of obtaining hydrogen by electrolyzing the fresh water obtained by the desalination apparatus 217 using the electric power from the dynamo 5. Fresh water is indispensable for producing hydrogen by utilizing electrolysis. Even in a place where fresh water is difficult to acquire, if there is the seawater W2, hydrogen can be produced using the desalination apparatus 217. The hydrogen obtained by the hydrogen production apparatus 220 is, for example, transported to every place after liquefied, and then, converted into electric power using a fuel battery.

In this way, in this embodiment, the seawater W2 discharged from the second hydraulic turbine 4 is effectively utilized. This makes it possible to, with less energy, extract mineral resources, desalinate seawater and cultivate fish and shellfish.

Hereinbefore, the first to seventh embodiments of the present invention are described in detail. However, concrete configurations thereof are not limited to these embodiments. Therefore, unless changes and modifications in design depart from the scope of the present invention, they should be construed as being included therein. For example, the power generator according to the present invention may also be disposed on the sea far away from the land. In that case, electric power obtained by a tidal current (ocean current) which is flowing fast can be supplied through a superconductive cable or the like to the land. According to the present invention, "on the ground" means above the water surface or the sea surface, and thus, it is not limited to the land. Hence, a structure which is artificially constructed in a river or a sea and located above the water surface or the sea surface is also included in "on the ground".

The invention claimed is:

1. A power generator, characterized by including:
   a first hydraulic turbine, immersed in a flowing body of water, which is driven by a flow of the water;
   a pump, immersed in the flowing body of water, which is connected to the first hydraulic turbine and draws up a part of the water;
   a pressure controlling means, located remotely from the flowing body of water, which accepts water discharged from the pump and limits the pressure of the water discharged from the pump to a predetermined pressure, wherein the pressure controlling means limits said pressure by returning a part of the accepted water to a downstream pipe;
   a second hydraulic turbine, located remotely from the flowing body of water, which is driven by the water received from the pressure controlling means;
   a speed governor that governs the speed of the second hydraulic turbine; and
   a dynamo, located remotely from the flowing body of water, which is driven by the second hydraulic turbine,
   wherein the speed governor automatically adjusts a quantity of the water supplied from the pressure controlling means to the second hydraulic turbine in line with a variation in the load of the dynamo to prevent a variation in a frequency of revolution of the dynamo.

2. The power generator according to claim 1, characterized in that a power storing means is provided which stores electric power generated by the dynamo.

3. The power generator according to claim 1 or 2, characterized in that a plurality of the first hydraulic turbines and the pumps are provided.

4. The power generator according to claim 1 or 2, characterized in that the first hydraulic turbine is driven by a flow of water accelerated using a speed-increasing weir.

5. The power generator according to claim 4, characterized in that the second hydraulic turbine and the dynamo are disposed on the speed-increasing weir.

6. The power generator according to claim 1 or 2, characterized in that the first hydraulic turbine and the pump are supported on a float which floats and moors on the water.

7. A power generation method, characterized by including the steps of:
   immersing a first hydraulic turbine in a flowing body of water;
   driving the first hydraulic turbine by a flow of the water;
   drawing up a part of the water by a pump connected to the first hydraulic turbine so that the water is sent to a location remote from the flowing body of water;
   limiting the pressure of the water discharged from the pump to a predetermined pressure at the location remote from the flowing body of water by returning a part of the accepted water to a downstream pipe;
   driving a second hydraulic turbine by the water whose pressure is controlled at the location remote from the flowing body of water;
   driving a dynamo by the second hydraulic turbine to generate electric power at the location remote from the flowing body of water, and
   governing the speed of the second hydraulic turbine by automatically adjusting a quantity of the water whose pressure is controlled and supplied to the second hydraulic turbine to be in line with a variation in the load of the dynamo to prevent a variation in a frequency of revolution of the dynamo.

8. The power generation method according to claim 7, characterized in that the electric power generated by the dynamo is used for producing hydrogen by electrolyzing water.

9. The power generation method according to claim 7, characterized in that the electric power generated by the dynamo is supplied to a vehicle which runs using an electric motor.

10. The power generation method according to any one of claims 7 to 9, characterized in that a plurality of the first hydraulic turbines and the pumps are provided.

11. The power generation method according to any one of claims 7 to 9, characterized in that the first hydraulic turbine is driven by a flow of water accelerated using a speed-increasing weir.

12. The power generation method according to claim 11, characterized in that the second hydraulic turbine and the dynamo are disposed on the speed-increasing weir.

13. The power generation method according to any one of claims 7 to 9, characterized in that the first hydraulic turbine and the pump are supported on a float which floats and moors on the water.

14. A power generator, characterized by including:
   a first hydraulic turbine immersed in a stream of fluid, wherein the first hydraulic turbine is driven by a flow of the stream;
   a pump immersed in the stream of fluid that is connected to the first hydraulic turbine and pumps fluid; and
   a power-generation house located remotely from the stream of fluid which receives the pumped fluid and includes:
      a pressure controlling means which limits the pressure of the pumped fluid to a predetermined pressure by returning a part of the accepted water to a downstream pipe;
      a second hydraulic turbine which is driven by the fluid from the pressure controlling means;
      a speed governor that governs the speed of the second hydraulic turbine; and
   a dynamo which is driven by the second hydraulic turbine,
      wherein the speed governor automatically adjusts a quantity of the water supplied from the pressure controlling means to the second hydraulic turbine in line with a variation in the load of the dynamo to prevent a variation in a frequency of revolution of the dynamo.

15. The power generator of claim 14, wherein power is transmitted from the first hydraulic turbine and pump to the power-generation house via hydrodynamic pressure.

16. The power generator of claim 14, further including:
a speed-increasing weir, immersed in the stream of water, that accelerates the flow of the stream near the first hydraulic turbine.

17. A power generator, characterized by including:
a first hydraulic turbine immersed in a stream of water, wherein the first hydraulic turbine is driven by a flow of the stream;
a pump immersed in the stream of water that is connected to the first hydraulic turbine and pumps water; and
a power-generation house located remotely from the stream of water which receives the pumped water and includes:
a pressure controller which accepts water discharged from the pump and controls the pressure of the water discharged from the pump to a predetermined pressure, wherein the pressure controller controls said pressure by returning a part of the accepted water to a downstream pipe;
a second hydraulic turbine which is driven by the water from the pressure controller;
a speed governor that governs the speed of the second hydraulic turbine, and
a dynamo which is driven by the second hydraulic turbine, wherein the speed governor automatically adjusts a quantity of the water supplied from the pressure controller to the second hydraulic turbine in line with a variation in the load of the dynamo to prevent a variation in a frequency of revolution of the dynamo.

18. The power generator of claim 17, wherein power is transmitted from the first hydraulic turbine and pump to the power-generation house via hydrodynamic pressure.

* * * * *

UNITED STATES PATENT AND TRADEMARK OFFICE
CERTIFICATE OF CORRECTION

| | | |
|---|---|---|
| PATENT NO. | : 7,948,106 B2 | Page 1 of 1 |
| APPLICATION NO. | : 12/064392 | |
| DATED | : May 24, 2011 | |
| INVENTOR(S) | : Tomio Sugano | |

It is certified that error appears in the above-identified patent and that said Letters Patent is hereby corrected as shown below:

Title Page:

In (54) Title, please correct the Title to read as follows:

(54) HYDRAULIC TURBINE POWER GENERATOR AND POWER GENERATION METHOD

Signed and Sealed this
Twelfth Day of July, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,948,106 B2 | Page 1 of 1 |
| APPLICATION NO. | : 12/064392 | |
| DATED | : May 24, 2011 | |
| INVENTOR(S) | : Tomio Sugano | |

It is certified that error appears in the above-identified patent and that said Letters Patent is hereby corrected as shown below:

Title Page, Item (54) and at Column 1, lines 1 and 2,

Please correct the Title to read as follows:

HYDRAULIC TURBINE POWER GENERATOR AND POWER GENERATION METHOD

This certificate supersedes the Certificate of Correction issued July 12, 2011.

Signed and Sealed this
Sixteenth Day of August, 2011

David J. Kappos
*Director of the United States Patent and Trademark Office*